United States Patent [19]
McDonald

[11] Patent Number: 5,421,254
[45] Date of Patent: Jun. 6, 1995

[54] STOVETOP BROASTER

[75] Inventor: William P. R. McDonald, Birmingham, Ala.

[73] Assignee: WLE Corporation, Birmingham, Ala.

[21] Appl. No.: 177,076

[22] Filed: Jan. 3, 1994

Related U.S. Application Data

[63] Continuation-in-part of Ser. No. 107,595, Aug. 18, 1993, abandoned.

[51] Int. Cl.⁶ .............................................. A47J 37/00
[52] U.S. Cl. ...................................................... 99/346
[58] Field of Search .................. 99/345, 346, 347, 419, 99/421 V, 532

[56] References Cited

U.S. PATENT DOCUMENTS

| | | | |
|---|---|---|---|
| 2,164,072 | 6/1939 | Kitzeman | 99/346 |
| 2,350,623 | 6/1944 | Kruea | 99/346 |
| 2,821,904 | 2/1958 | Arcabosso | 99/346 |
| 3,412,673 | 11/1968 | Landis | 99/346 |
| 3,713,378 | 1/1973 | West et al. | 99/346 |

FOREIGN PATENT DOCUMENTS

| | | | |
|---|---|---|---|
| 0048208 | 8/1909 | Switzerland | 99/346 |
| 0052250 | 7/1910 | Switzerland | 99/346 |

Primary Examiner—Stephen F. Gerrity
Assistant Examiner—Reginald L. Alexander
Attorney, Agent, or Firm—Veal & Marsh

[57] ABSTRACT

The present invention is designed for used with ordinary covered cooking pots, and provides a mechanism for continuous basting of meat with added liquid and natural juices that have been heated to high temperatures. A concave base plate with notches on its edge is placed in the bottom of a cooking pot, with the edge of the plate resting against the bottom of the pot. A hollow, tubular stem is inserted vertically into an aperture in the base plate. A perforated tray with supports extending from its bottom surface is placed over the base plate. A cut of meat is placed on the tray, with the stem extending through a hole cut into the meat. A perforated plate is placed around the upper end of the stem and a flat bonnet is attached to the plate directly over the end of the stem. The pot is filled with liquid to a level below that of the meat tray and is covered. As the pot is heated, the liquid in the bottom of the pot is forced upward through the stem. As it exits the end of the stem, it is deflected down onto the perforated plate, and drips through the perforations onto the meat, basting it. As the liquid and the natural juices drip from the meat, they return to the bottom of the pot, and the cyclical process is repeated. The meat is cooked from the outside by the basting, and from the inside by heat transferred from the stem.

3 Claims, 4 Drawing Sheets

STOVETOP BROASTER

This application is a continuation-in-part of application Ser. No. 08/107,595, now abandoned, filed Aug. 18, 1993, which is commonly owned by the assignee herein.

FIELD OF THE INVENTION

The present invention relates to cooking. More particularly, the present invention relates to cooking on a stovetop, or over an alternate heat source such as a hot plate, gelatinous alcohol-based fuel, or campfire. In even greater particularity, the present invention relates to cooking rapidly by continually basting food with heated added liquid or natural juices. In even greater particularity, the present invention relates to cooking meats rapidly by continuous basting with heated added liquid or natural juices and by conductive heat transfer from a heat source placed within the meat.

BACKGROUND OF THE INVENTION

A variety of different cooking appliances and methods of cooking are presently known in the art, including ovens, microwaves, crock pots, broilers, grills, and steamers. While all of these may be used for cooking meats, all have disadvantages. Oven roasting, while it provides excellent results, requires a substantial length of time, and consequently a substantial amount of energy. In the case of larger cuts of meat, it further requires that the cook manually baste the meat repeatedly during the cooking process to prevent the meat from drying. Although crock pots eliminate the necessity for basting the meat, they cook at a low temperature and therefore require even more time than oven roasting for a comparable size cut of meat, often as long as nine or ten hours. Microwave ovens significantly reduce the time required for cooking, but yield poor results in terms of flavor, tenderness, juiciness and consistency when used to cook meats. Broilers, grills and steamers provide good results when cooking thin cuts of meat such as fillets, but are inadequate for cooking larger cuts; they also require constant monitoring of the cooking process by the cook.

SUMMARY OF THE PRESENT INVENTION

With the foregoing in mind, the principal object of the present invention is to provide an apparatus for cooking which yields superior results when used for cooking meats, in terms of flavor, tenderness, juiciness and consistency.

Another object of the invention is to significantly reduce the required cooking times for meats, thereby reducing energy consumption, without sacrificing quality.

Yet another object of the invention is to provide ease of use, by reducing the amount of intervention and monitoring required by the cook during the cooking process.

Yet another object of the invention is to provide a cooking apparatus that provides flexibility by rendering superior results when used for cooking meats over alternate heat sources, such as campfires or gelatinous alcohol-based fuel.

These and other objects of the present invention are accomplished through the use of a mechanism for continuous basting of meat with added liquid and natural juices that have been heated to high temperatures. The present invention is designed for use with ordinary covered cooking pots. The invention may be manufactured in different sizes to accommodate varying sizes of cuts of meat and cooking pots. A concave base plate with notches on its edge is placed in the bottom of a cooking pot, with the edge of the plate resting against the bottom of the pot. A hollow, tubular stem is inserted vertically into an aperture in the base plate. A perforated tray with supports extending from its bottom surface is placed over the base plate. A cut of meat is placed on the tray, with the stem extending through a hole cut into the meat. A perforated plate is placed around the upper end of the stem and a flat bonnet is attached to the plate directly over the end of the stem. The pot is filled with liquid to a level below that of the meat tray and is covered. As the pot is heated, the liquid in the bottom of the pot is forced upward through the stem. As it exits the end of the stem, it is deflected down onto the perforated plate, and drips through the perforations onto the meat, basting it. As the liquid and the natural juices drip from the meat, they return to the bottom of the pot, and the cyclical process is repeated. The meat is cooked from the outside by the basting, and from the inside by heat transferred from the stem. The cover is not removed from the pot during the cooking process.

The invention is well-suited for outdoor cooking and cooking under emergency conditions, as it works well over a campfire, portable stove or gelatinous alcohol-based fuel. Although it was designed primarily for use in cooking meats, it obviously may be used for cooking other foods, such as vegetables.

BRIEF DESCRIPTION OF THE DRAWINGS

The foregoing objects and advantages of the present invention for a cooking apparatus will be more readily understood by one skilled in the art by referring to the following detailed description of a preferred embodiment and to the accompanying drawings which form a part of this disclosure, and wherein.

DETAILED DESCRIPTION OF THE INVENTION

As may be seen in FIGS. 1-10, the present invention consists of a number of separate elements that, when assembled and placed within a covered cooking pot, forms a cooking apparatus that continuously bastes the contents of the cooking pot with heated liquid, thereby cooking it. In the preferred embodiment, the elements are constructed of either 304 polished stainless steel or polished high grade aluminum.

Figure 1:
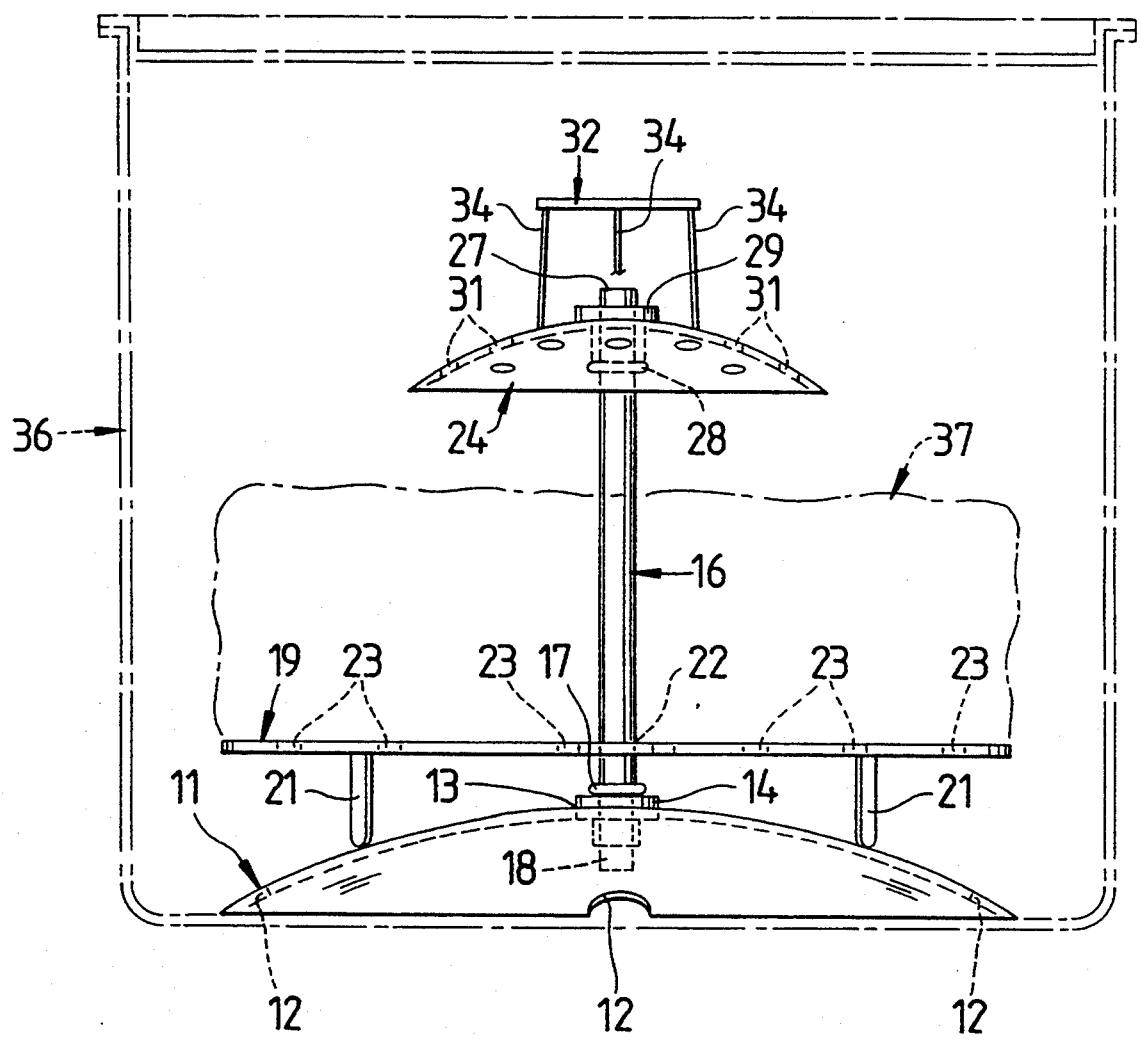
FIG. 1 is a side elevational view of the present invention, as assembled, showing the respective positions of all of the components.
Figure 2:
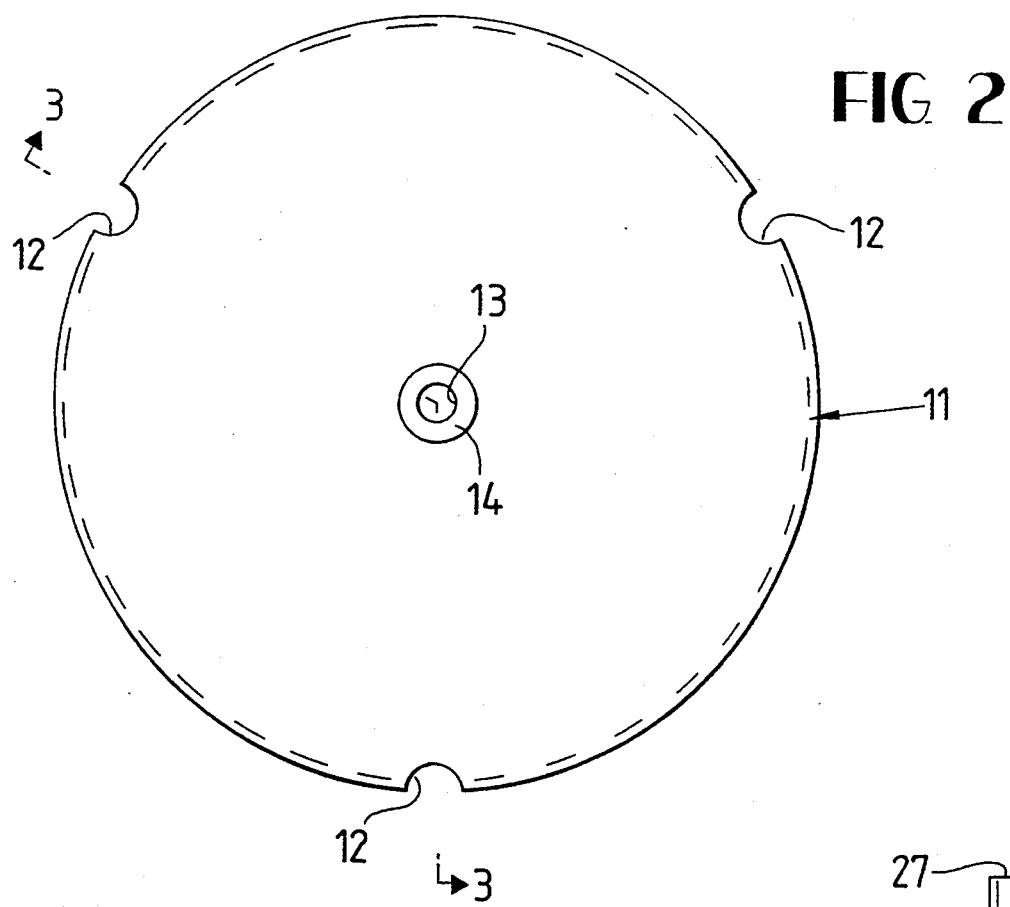
FIG. 2 is a top plan view of the base plate.
Figure 3:
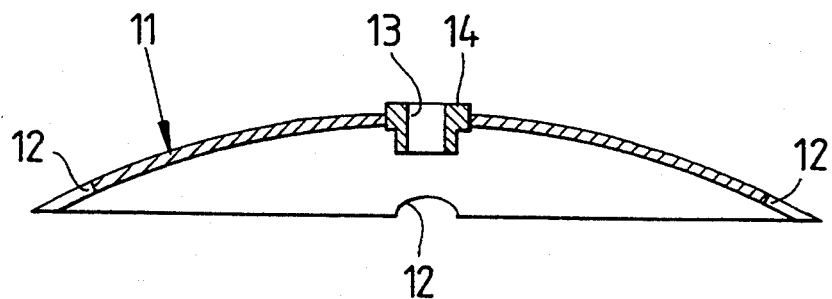
FIG. 3 is a sectional view of the base plate taken along line 3—3 of FIG. 2.
Figure 4:
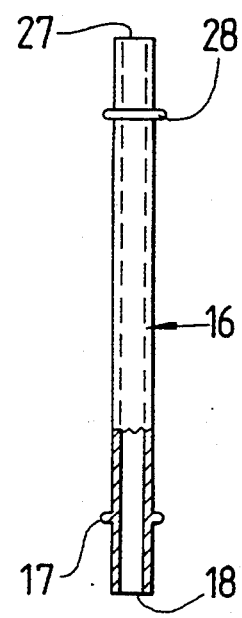
FIG. 4 is a side elevational view of the media stem.
Figure 5:
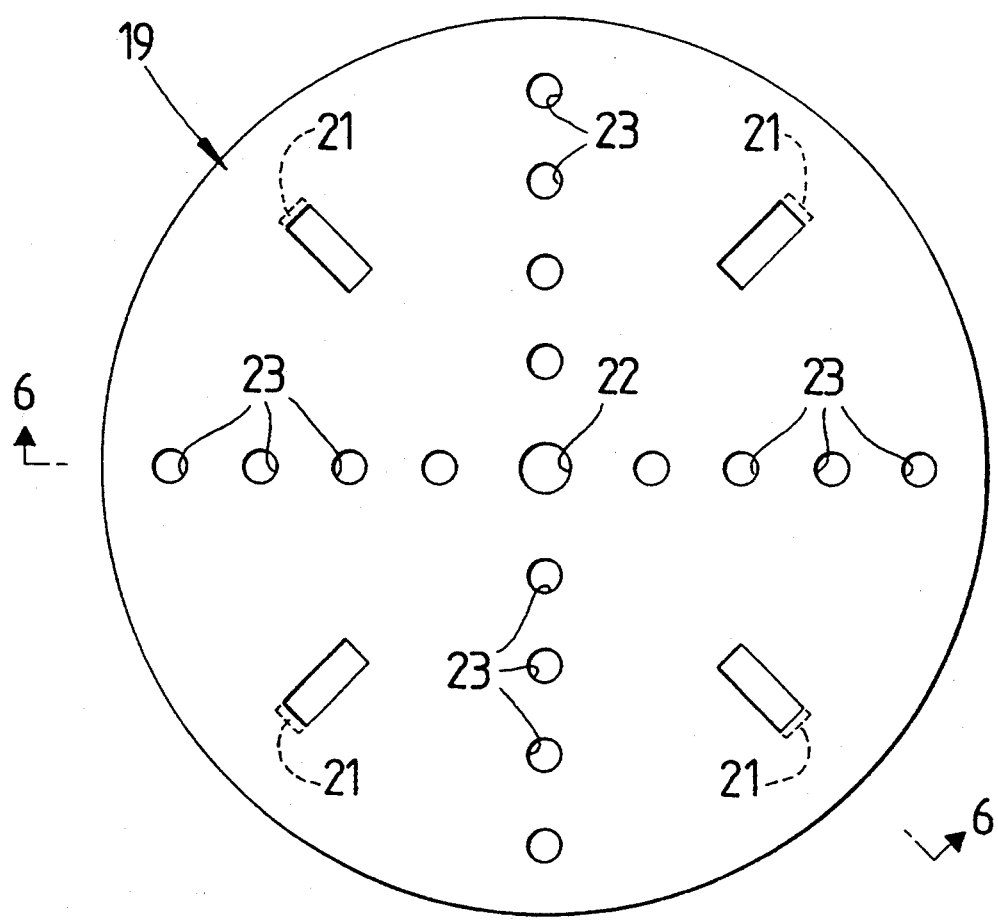
FIG. 5 is a top plan view of the tray.
Figure 6:
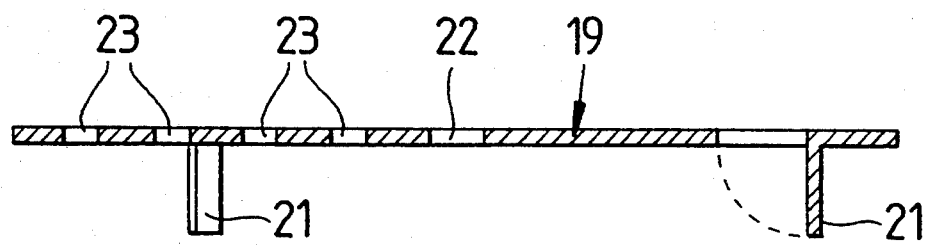
FIG. 6 is a sectional view of the tray, taken along line 6—6 of FIG. 5.
Figure 7:
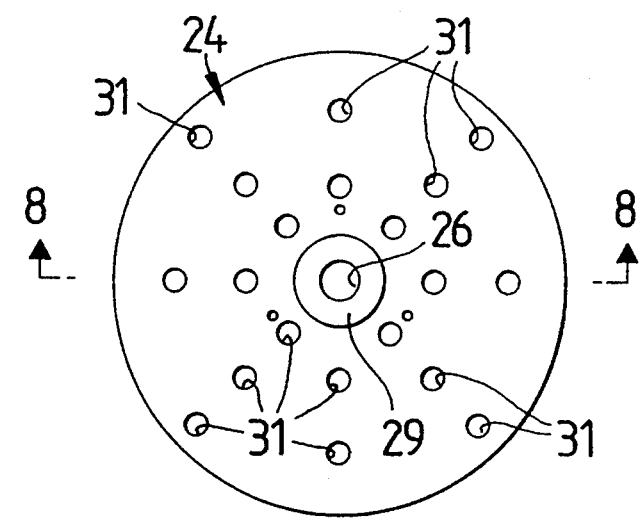
FIG. 7 is a top plan view of the media distribution plate.
Figure 8:
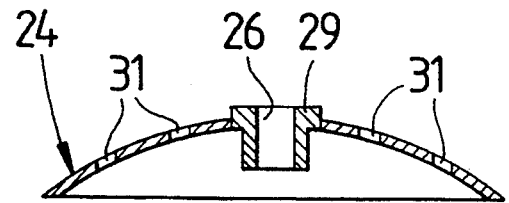
FIG. 8 is a sectional view of the media distribution plate along line 8—8 of FIG. 7.
Figure 9:
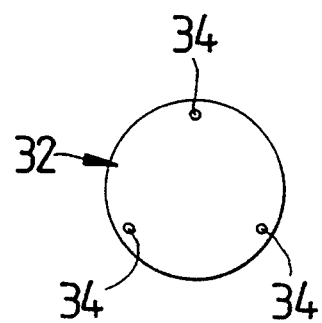
FIG. 9 is a top plan view of the bonnet.
Figure 10:
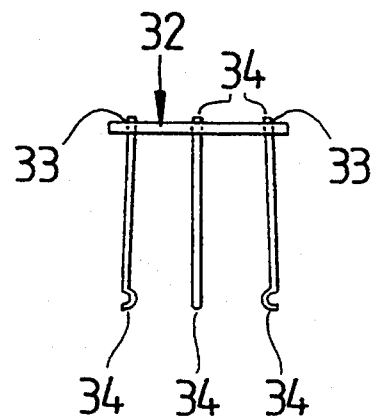
FIG. 10 is a side elevational view of the bonnet.

The invention includes a concave base plate 11, which in the preferred embodiment is circular. The base plate has notches 12 on its outer periphery (FIG. 2). An aperture 13 in the plate 11 is reinforced by a sleeve 14 (FIG. 3). A tubular media stem 16 (FIG. 4), which may be of varying lengths, is inserted into the aperture 13 in the base plate 11. The diameter of the stem 16 must be of a size such that the stem will fit snugly within the aperture 13. Media stem 16 has a first annular stop 17 positioned at a distance from its first end 18 which is less than the height of the base plate 11 so that when media stem 16 is inserted into base plate 11, the first end 18 of the media stem 16 does not touch the bottom of the cooking pot. A planar tray 19 (FIG. 5), having a plurality of vertical support members 21 extending from its lower surface (FIG. 6), a central aperture 22, the diameter of which exceeds the diameter of media stem 16, and a plurality of other apertures 23, is placed on the base plate 11 so that the vertical support members 21 rest on the top of the base plate 11 and the media stem 16 extends vertically through the aperture 22 in the tray. As shown, the vertical support members 21 are formed by stamp cutting the tray 19 so that strips of the metal may be folded down at a 90 degree angle, leaving large slots in the tray. Alternatively, vertical support members may be formed separately and rigidly affixed to the bottom of the tray 19. A media distribution plate 24 (FIG. 7 and FIG. 8), which in the preferred embodiment is concave downward and circular, and which has a central aperture 26, is placed over a second end 27 of the media stem. The aperture 26 is of a diameter sufficient to allow it to slide over the second end 27 of the media stem 16, but smaller than the diameter of a second annular stop 28 formed near the second end 27 of the media stem 16. In the preferred embodiment, the central aperture 26 of the media distribution plate 24 is also reinforced with a sleeve 29. Although it is not necessary to the proper functioning of the invention, in the preferred embodiment, the distance from the first stop 17 to the first end 18 of the media stem 16 is equal to the distance from the second stop 28 to the second end 27 of the media stem 16, so that either end may be inserted into the base plate 11. The media distribution plate has a plurality of other apertures 31 distributed over its surface (FIG. 7). A planar bonnet 32 (FIG. 9) is attached to the top of the media distribution plate 24 in a position directly above the second end 27 of the media stem 16. In the preferred embodiment, the bonnet 32 has a plurality of small apertures 33 along its outer edge, for receiving the ends of clips 34 which are used to attach the bonnet 32 to the media distribution plate 24 (FIGS. 9, 10). Alternate means of attachment such as screws or pins could also be used.

The invention is used by placing the base plate 11, the media stem 16, and the tray 19 into a cooking pot 36. A cut of meat 37 is placed on the tray 19, with the media stem 16 extending upward through a hole that has been cut through the meat, preferably at its center. The cooking pot is filled with liquid to a level just below the bottom of the tray 19. The media distribution plate 24 and the bonnet 32 are placed on the media stem 16, and the cooking pot lid is placed on the pot. As the pot is heated, the liquid expands and is forced upward through the media stem 16. As the heated liquid exits the second end 27 of the media stem 16, it hits the bottom of the bonnet 32, and is deflected downward onto the media distribution plate 24. The liquid drips through the apertures 31 in the media distribution plate 24 onto the meat. The liquid and the natural juices from the meat flow through the apertures 23 in the tray 19, and down the upper surface of the base plate 11 to the side edges of the bottom of the cooking pot 36. There, the liquid and juices flow through the notches 12 in the periphery of the base plate 11, toward the center of the bottom of the cooking pot. As the liquid is reheated, it again rises through the media stem 16, and the process is repeated. The pot is kept over high heat until the liquid first comes to a boil, then is reduced to medium heat. The cyclical basting of the meat with hot liquid and natural juices continues for as long as the heat source is applied to the bottom of the cooking pot. The basting of the meat cooks the meat from the outside. The meat is also cooked from the inside by the process of heat conduction outward from the media stem 16 as the heated liquid passes through the stem.

Having set forth the nature of the invention, what is claimed is:

1. A cooking apparatus for use in combination with a covered pot, comprising:
    (a) a concave base plate, having a central aperture and at least one notch at its outer periphery;
    (b) a tubular media stem, having an outer diameter of a size to fit securely within said aperture of said base plate, a first radially extending stop positioned at a distance from a first end of said media stem which is less than the depth of said base plate, and a second radially extending stop positioned between said first stop and a second end of said media stem, said first end of said media stem being removably disposed within said aperture of said base plate;
    (c) a planar tray, having a plurality of vertical support members extending from the bottom of said tray and a plurality of apertures, including a central aperture, the size of said central aperture of said tray exceeding the diameter of said media stem at its widest point, said tray being removably disposed about said media stem with said media stem extending through said central aperture of said tray such that said vertical support members rest against the top of said base plate;
    (d) a media distribution plate, having a plurality of apertures, including a central aperture, said central aperture of said media distribution plate being of a size to allow said second end of said media stem to pass through said aperture while preventing said second stop from passing through said aperture, said plate being removably disposed around said second end of said media stem; and
    (e) a planar bonnet, attached to the top of said media distribution plate and positioned a distance from and directly above said second end of said media stem.

2. An apparatus as defined in claim 1, further comprising:
    (a) a sleeve, rigidly affixed within, and reinforcing said central aperture of said base plate; and
    (b) a second sleeve, rigidly affixed within, and reinforcing said central aperture of said media distribution plate.

3. An apparatus as defined in claim 1, wherein said base plate, said media stem, said media distribution plate, said tray and said bonnet are made from a metal selected from the group consisting of 304 polished stainless steel and polished high grade aluminum.

* * * * *